US008237518B2

(12) United States Patent
Andreasson

(10) Patent No.: US 8,237,518 B2
(45) Date of Patent: Aug. 7, 2012

(54) ANTENNA-FILTER MODULE

(75) Inventor: Krister Andreasson, Stockholm (SE)

(73) Assignee: Powerwave Technologies Sweden AB, Kista (SE)

( * ) Notice: Subject to any disclaimer, the term of this patent is extended or adjusted under 35 U.S.C. 154(b) by 168 days.

(21) Appl. No.: 12/441,373

(22) PCT Filed: Aug. 31, 2007

(86) PCT No.: PCT/SE2007/000760
§ 371 (c)(1), (2), (4) Date: Mar. 13, 2009

(87) PCT Pub. No.: WO2008/033068
PCT Pub. Date: Mar. 20, 2008

(65) Prior Publication Data
US 2009/0295504 A1 Dec. 3, 2009

(30) Foreign Application Priority Data
Sep. 14, 2006 (SE) ...................................... 0601889

(51) Int. Cl.
*H01P 5/12* (2006.01)
*H04B 1/38* (2006.01)

(52) U.S. Cl. ........................................ 333/134; 333/203

(58) Field of Classification Search .................. 333/134, 333/203, 206, 204; 343/700 MS
See application file for complete search history.

(56) References Cited

U.S. PATENT DOCUMENTS

| | | | | |
|---|---|---|---|---|
| 4,660,004 | A * | 4/1987 | Jachowski | 331/134 |
| 4,890,078 | A * | 12/1989 | Radcliffe | 333/134 |
| 4,937,533 | A * | 6/1990 | Livingston | 333/126 |
| 4,980,662 | A * | 12/1990 | Simon et al. | 333/134 |
| 5,428,325 | A * | 6/1995 | Jachowski et al. | 333/203 |
| 5,446,729 | A * | 8/1995 | Jachowski | 370/339 |
| 5,684,492 | A * | 11/1997 | Kagoshima et al. | 343/700 MS |
| 6,005,455 | A * | 12/1999 | Lindell et al. | 333/134 |
| 6,313,797 | B1 * | 11/2001 | Kurita et al. | 343/700 MS |
| 6,426,725 | B2 * | 7/2002 | Hiroshima et al. | 343/741 |
| 6,549,166 | B2 * | 4/2003 | Bhattacharyya et al. | 343/700 MS |
| 6,806,791 | B1 * | 10/2004 | Wang et al. | 333/134 |
| 6,812,808 | B2 * | 11/2004 | Gaukel et al. | 333/126 |
| 2003/0060172 | A1 | 3/2003 | Kuriyama et al. | |

OTHER PUBLICATIONS

Froppier, B. et al.; "Integration of a filtering function in an electromagnetic horn", 33rd European Microwave Conference, Munich 2003, pp. 939-942.
Blondeaux, H. et al.: "Microwave Device Combining Filtering and Radiating Functions for Telecommunication Satellites", 2001 IEEE MTT-S Digest, pp. 137-140.
PCT International Search Report for International Application No. PCT/SE2007/000760 dated Dec. 12, 2007.
Queudet, F. et al. "Integration of pass-band filters in patch antennas", 32nd European Microwave Conference, Milan—2002, pp. 685-688.

* cited by examiner

*Primary Examiner* — Seungsook Ham
(74) *Attorney, Agent, or Firm* — OC Patent Law Group

(57) ABSTRACT

The present invention relates to an antenna-filter module for transferring radio frequency electromagnetic signals between the ambient air and an electronic circuit. The module includes an antenna element and at least two integrated band pass filter disposed adjacent to said antenna element. The antenna element is arranged as a joint antenna element, having a substantially greater bandwidth than each filter and providing a number of antenna-filter combinations within the module. The joint antenna element is arranged in close proximity to a first resonator of each filter in the module so as to provide an electromagnetic coupling to the resonators of each filter and a differentiated, specific pass band for the respective antenna-filter combination. Each filter is provided with a coupling member for coupling to an electronic circuit, such as an amplifier.

19 Claims, 9 Drawing Sheets

ANTENNA-FILTER MODULE

FIELD OF THE INVENTION

The present invention relates to an antenna-filter module for transferring radio frequency (RF) electromagnetic signals in either direction through the module (in one direction or in both directions), including an antenna element and an integrated filter being provided with a series of resonators.

Modern systems for mobile and satellite communication systems require antennas with band pass filters being located as close to the antenna elements as possible, e.g. in order to improve the signal-to-noise ratio in the communication signals being transferred. Amplifiers are also arranged in the vicinity of the antenna, e.g. low noise amplifiers (LNA) for amplifying relatively weak signals being received by the antenna and also power amplifiers (PA) for amplifying signals to be transmitted. Thus, relatively short transmission lines, if any, should be used between the various components in order to minimise the inevitable losses.

There is also a desire to make antennas with a plurality of antenna elements so as to permit beam steering. Then, each antenna element has to operate separately, and there will therefore be a large number of components in the system, including a great number of antenna elements, filters, amplifiers, transmission lines and connectors. All these components make such systems complicated and expensive. Accordingly, there is a need for integrated antenna-filter modules and possibly also integrated antenna-filter-amplifier modules without any transmission lines or connectors within each module.

PRIOR ART

Several attempts have been made to integrate antennas and filters in order to reduce the number of components. A rather simple way, proposed by H. Blondeaux et al in the article "Microwave devices combining filtering and radiating functions for telecommunication satellites", IEE MTT-S, 2001, is to make an opening in a box-like filter casing, so as to provide the filter with a radiating capacity as well. The filter includes two half-wave resonators in two superposed cavities coupled by a slot or iris in a metallic layer. However, such a radiating filter, with just an opening in the casing, has a drawback in that the antenna gain is insufficient for practical purposes. Also, half-wave resonators will make the dimensions rather large for filters operating in the frequency range (about 1-6 GHz) normally used in mobile communication systems.

It has also been suggested (B Froppier et al, "Integration of a filtering function in an electromagnetic horn", 33$^{rd}$ European Microwave Conference, 2003) to arrange metal posts in a microwave antenna horn in order to achieve a filtering function within the antenna itself. This approach is not either feasible in the above-mentioned frequency range of 1-6 MHz.

In other studies, see e.g. F. Queudet et al, "Integration of pass-band filters in patch antennas", 32$^{nd}$ European Microwave Conference, 2002, pass band filters are integrated with patch antennas. Here, one makes use of miniaturized microstrip or microslot resonators on a dielectric substrate, being mounted at a matching point being directly connected to the patch. The combination becomes very compact, but the patch is designed to operate as one of the resonating components of the combination. The Q-value of the patch will determine the bandwidth of the filter, and there is no flexibility in selecting a desired bandwidth for the combination.

OBJECT OF THE INVENTION

Against this background, it is a main object of the invention to provide an antenna-filter module, for use in mobile communication systems, including a joint antenna element and two or more filters operating independently of each other, in different frequency bands and/or in different polarisations.

A further main object is to provide an antenna-filter module that will enable a selection of the particular bandwidth of each filter independently of the joint antenna element, without the intermediary of any transmission line, while securing a low insertion loss for the combination and a good antenna performance.

A still further object is to provide a module which includes, apart from the joint antenna element and the filters, an amplifier being coupled to the respective filter and being integrated into the module, without any intermediary transmission lines or connectors between the components of the module.

SUMMARY OF THE INVENTION

According to the present invention, the above-stated main objects are achieved by the combination of the following features:

- the module includes at least two filters disposed adjacent to the antenna element,
- the antenna element is arranged as a joint antenna element so as to provide a corresponding number of antenna-filter combinations within the module,
- each filter is provided with a coupling member for coupling to a respective electronic circuit,
- said joint antenna element has a substantially greater bandwidth than each filter, and
- said joint antenna element is arranged in close proximity to a first resonator of each filter in the module so as to provide an electromagnetic coupling to each filter and a differentiated, specific pass band for the respective antenna-filter combination.

Preferably, each filter in the module is a cavity filter having an electrically conductive casing, the cavity of each filter being provided with a coupling aperture dimensioned and located so as to secure the coupling between the joint antenna element and said first resonator in the respective filter.

Antenna-filter modules according the invention all have very small losses, since the resonators of the filters are very close to the joint patch antenna element and are coupled to the joint antenna element without any intermediary transmission lines or connectors. A module according to the present invention can therefore present a low noise level and will constitute a compact and cheap integrated antenna-filter module having a good antenna performance.

These and other features will be apparent from the detailed description below.

Accordingly, the invention will now be explained further with reference to the drawings which illustrate some preferred embodiments of the invention.

DETAILED DESCRIPTION OF PREFERRED EMBODIMENTS

Figure 1:
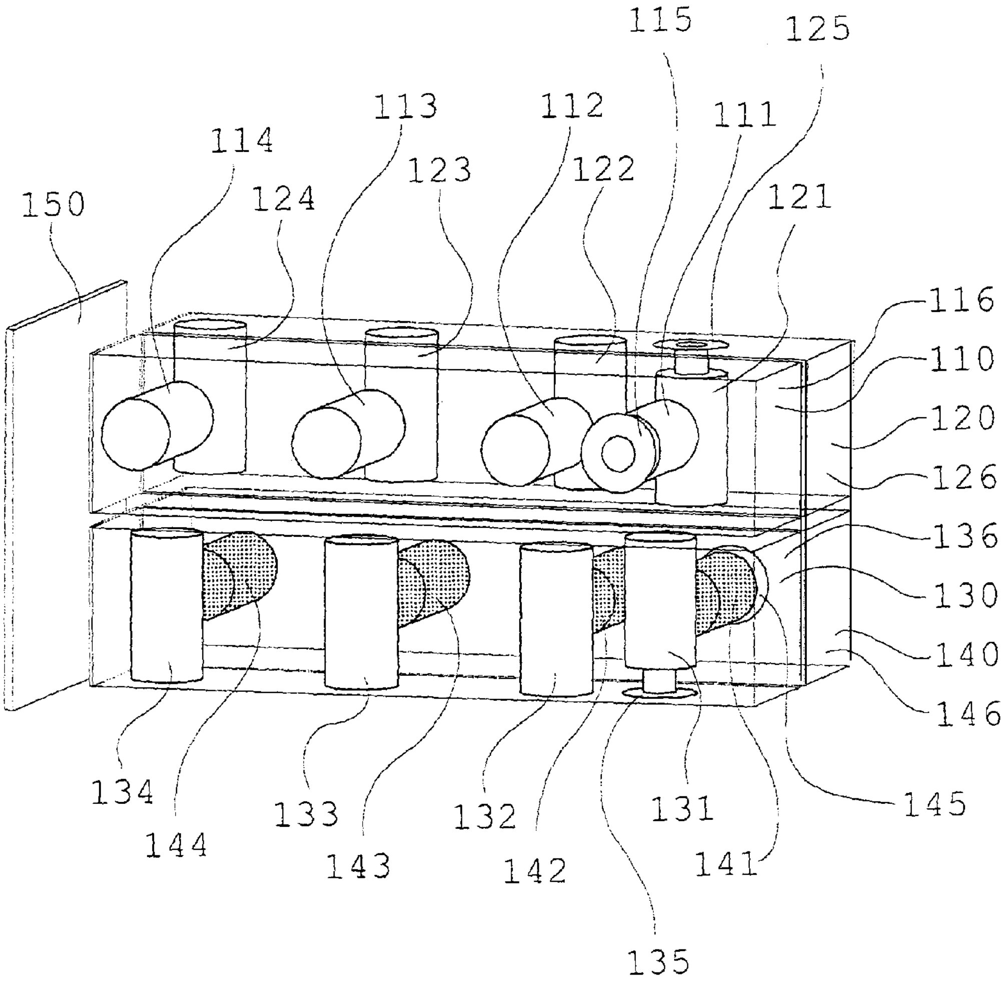
FIG. 1 is a schematic perspective view of an antenna-filter module according to the invention, including four parallel filters arranged in parallel to each other in rectangular boxes and coupled to a patch antenna element.
Figure 2:
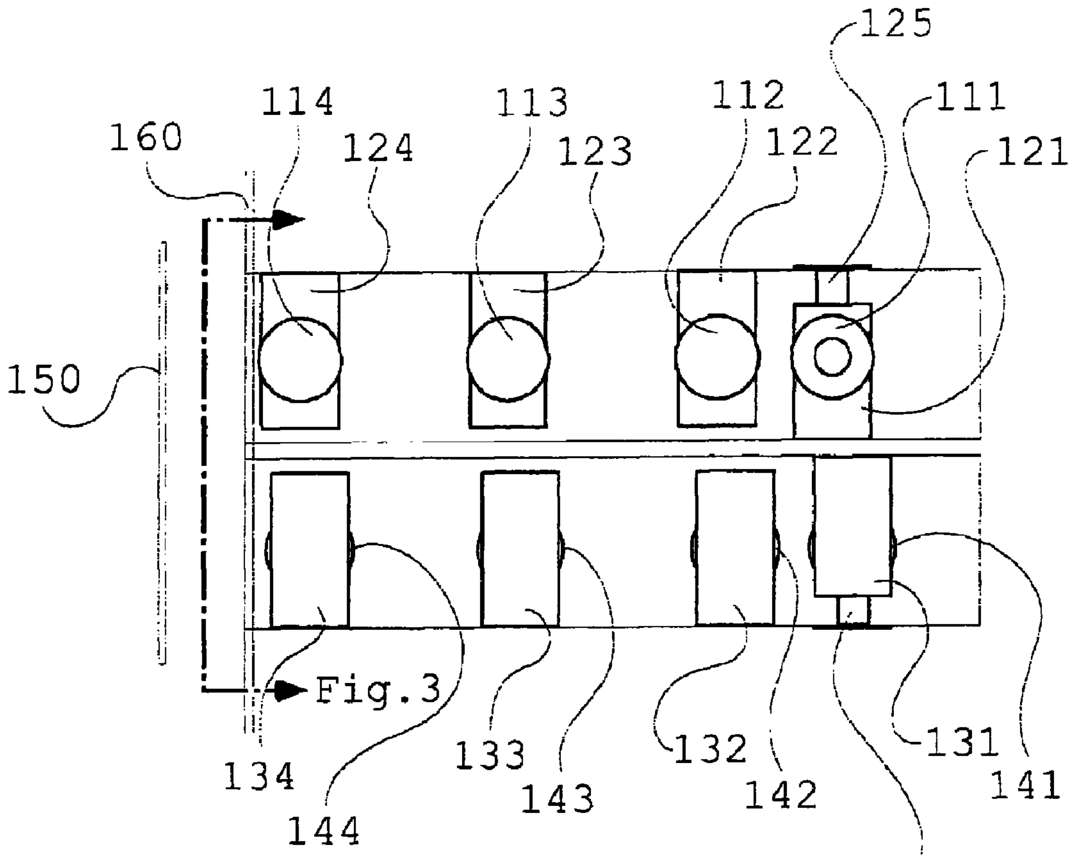
FIG. 2 is a side view of the module shown in FIG. 1.
Figure 3:
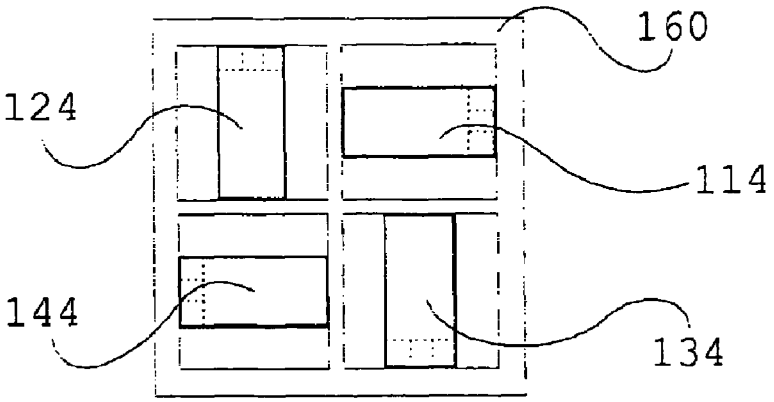
FIG. 3 is an end view from the left of the module shown in FIG. 1, showing the ground plane and the filters.

FIGS. 1-3 show different views of an antenna-filter module according to a first embodiment of the present invention. In FIGS. 1-3 the same parts of the module have been given the same reference numbers.

The antenna-filter module of the first embodiment of the invention includes four comb-line filters 110, 120, 130, 140 coupled to a patch antenna element 150. Each filter includes four round rods 111-114, 121-124, 131-134, 141-144 situated within rectangular box-like casings 116, 126, 136, 146. The three rods in each filter being closest to the patch antenna element, rods 112-114, 122-124, 132-134, 142-144, function as resonator rods and the rod in each filter being farthest away from the patch antenna element, rods 111, 121, 131, 141, are used for coupling. In this exemplary embodiment cavity filters having electrically conductive casings, such as comb-line filters with three rod resonators are used for filtering. A skilled person realises, however, that also other types of filters could be used. The filters can be designed into any suitable shape and number of resonators.

The four filters 110, 120, 130, 140 are situated in parallel with each other, and with a first of their short side ends in close proximity to the patch antenna. Each of the filters has a square or rectangular cross sectional shape. The four filters are, when viewed from the short side ends, placed next to each other in a two by two formation. The short side ends of the four filters thereby together form a substantially square or rectangular pattern. This can be seen in FIG. 3, which shows an end view from the left of the short side ends of the ground plane 160 and the filters 110, 120, 130, 140, the way they would look seen from the patch antenna 150. FIG. 3 shows that there are four apertures in the ground plane where the four filters meet the ground plane 160.

The long sides of the filters extend perpendicularly from the patch antenna 150, and the rods 111-114, 121-124, 131-134, 141-144 are spaced along the length of the long sides of the filters. The rod of each filter being farthest away from the patch antenna, rods 111, 121, 131, 141, all have coaxial cable contacts 115, 125, 135, 145 for connecting each filter to other electrical circuits, such as LNA:s (Low Noise Amplifiers) or PA:s (Power Amplifiers). The resonator rods being closest to the patch antenna, resonators 114, 124, 134, 144, are coupled to the patch antenna by an electromagnetic coupling through the apertures in the ground plane 160. These apertures in the ground plane are substantially square or rectangle openings coinciding with the short side ends of the four filters, thereby providing coupling of the electrical field from the resonators to the antenna element.

The three resonator rods in each of the four filters being closest to the patch antenna, resonators 112-114, 122-124, 132-134, 142-144, can have screws for trimming the capacitance between the end of the resonators not being attached to the casing and the opposite wall of the casing, i.e. between the end of the resonators and the side of the casing facing the vertical or horizontal centre lines of the module. These trimming screws can either be screwed through the resonators or through the side wall of the casing. These possible trimming screws are not shown in FIGS. 1-3.

According to the invention, the bandwidth of the patch antenna 150 is bigger than the bandwidths of each of the filters 110, 120, 130, 140. The total bandwidth for the whole antenna-filter module is set by the coupling between the patch antenna 150 and the resonators closest to the patch antenna element, resonators 114, 124, 134, 144. The filters of the antenna-filter module are tuned together with the patch antenna element 150, this being the case since the patch antenna element 150 has a similar influence on the characteristics of the filter as an input coupling rod in a comb-line filter. Thus, the filter housings do not have a complete filter characteristic without the patch antenna element. The filter and the patch antenna element are therefore tuned together.

The four comb-like filters 110, 120, 130, 140 being arranged according to the first embodiment of the invention are all coupled to the same patch antenna element 150. In this way, two different frequency channels for each of the two polarisations can be achieved. This embodiment will thus result in a very compact antenna diplexer function.

According to the invention, the antenna element is used as a joint antenna element, operating together with a number of filters, and thereby providing a number of antenna-filter combinations within the module. The antenna element in the exemplary embodiment shown in FIGS. 1-3 is said to be a patch antenna element. It is, however, clear to a person skilled in the art that other types of antennas could be used for the joint antenna. The joint antenna element can thus for example comprise at least one patch radiator or at least one dipole radiator. The joint antenna element can also comprise at least two parts. The joint antenna can thus be a yagi antenna structure, cooperating patch radiators arranged on top of each other in a stack or patch radiators arranged side by side. A skilled person realises that also other types of antennas, antenna structures or combination of antenna elements may be used in accordance with this invention.

Although not shown in FIGS. 1-3, it is also an optional feature of the present invention to integrate amplifiers with the filters of the antenna-filter module, thereby providing an integrated antenna-filter-amplifier module. These amplifiers, such as LNA:s and PA:s, can be coupled to the filters through the coaxial cable contacts 115, 125, 135, 145. These amplifiers can also be coupled to the rods 111, 121, 131, 141 by electromagnetic coupling, in the same way that rods 114, 124, 134, 144 are coupled to the antenna element. By integrating the amplifiers with the antenna-filter module using electromagnetic coupling, no transmission lines or connectors are used within the integrated antenna-filter-amplifier module, which minimises the losses.

Figure 4:
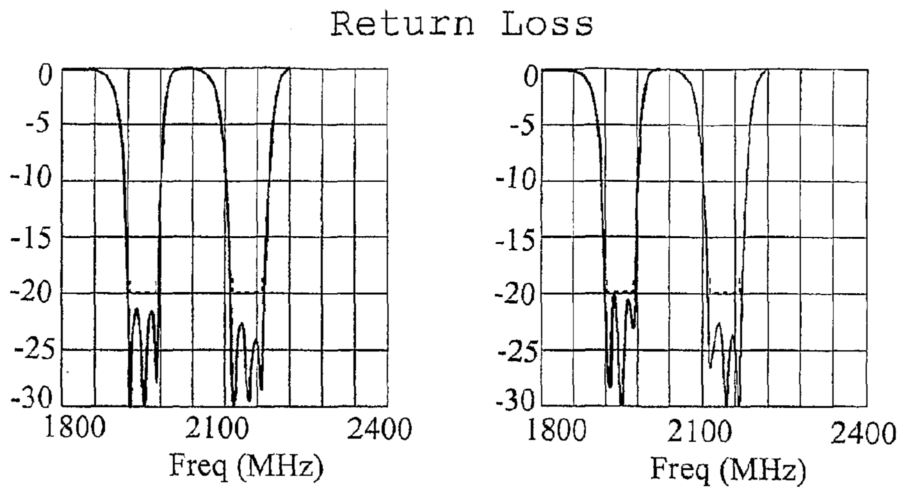
FIGS. 4, 5 and 6 are diagrams showing the return loss, the cross coupling between the various filters and the directivity, respectively, of the module shown in FIGS. 1-3.
Figure 5:
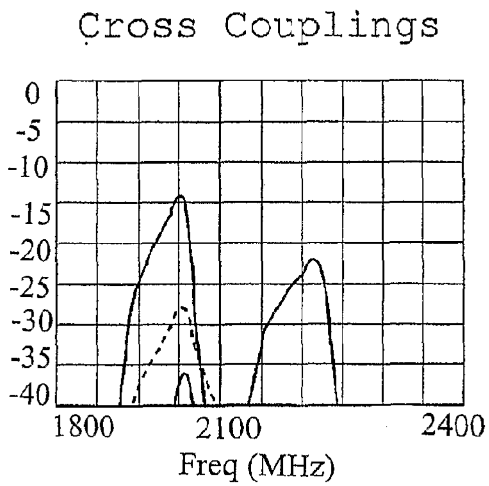
Figure 6:
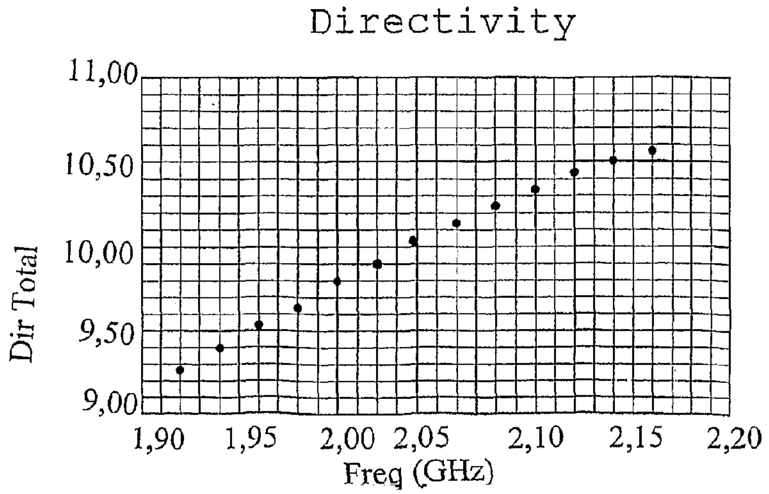

FIGS. 4, 5 and 6 show simulation diagrams of the return loss, the cross coupling between the various filters and the directivity of the antenna-filter module of the first embodiment shown in FIGS. 1-3. The simulations are done as if signals and also measurement instruments would have been applied to the coaxial cable contacts of the filters 115, 125, 135, 145.

FIG. 4 shows the simulated return loss for the first embodiment. The return loss simulation indicates that the filtering function of the antenna-filter module has a three pole filter characteristic. The three pole characteristic is due to the fact that three rods in each filter, resonators rods 112-114, 122-124, 132-134, 142-144, are used as filtering resonators. The rod of each filter being farthest away from the patch antenna element, rods 111, 121, 131, 141, are used for coupling and the patch antenna element 150 does also not function as a resonator.

In the two diagrams in FIG. 4 the return loss for two polarisations are shown. Both polarisations have two frequency channels, one around 1950 MHz and one around 2150 MHz. It is clear from the diagrams that a very good return loss characteristic is provided by the antenna-filter module according to the first embodiment of the invention. A return loss as the one shown in FIG. 4 reveals that there is a very good coupling through the filter, between the filter and the patch antenna element and further into the air for the frequency channels. It further shows that very much of the energy is reflected outside the frequency channels.

FIG. 5 shows the cross couplings between the filters of the antenna-filter module. A signal is here applied to one of the coaxial contacts 115, 125, 135, 145 and the signal is then measured in another of the coaxial contacts. Cross coupling thus gives a measure of how much energy that leaks over from one filter through the antenna element and to a second filter. FIG. 5 shows that the level of the cross couplings for an antenna-filter module according the first embodiment of the invention is so small that is does not impair the function of the module.

FIG. 6 shows the directivity of an antenna-filter module according to the first embodiment of the invention. The directivity diagram shows that the antenna-filter module has a directivity corresponding the directivity of a normal patch antenna. The combining of filter and antenna into an antenna-filter module according to the invention will thus not impair the directivity.

From what is shown in FIGS. 4-6 we can conclude that the antenna-filter module according to the invention functions very well as an antenna.

The antenna-filter module according to the first embodiment of the present invention presents an integrated antenna-filter module having a number of selectable frequency channels and/or different polarisations. The module is constructed without any intermediary transmission lines or connectors between components of the module, thereby achieving low losses. The module further presents a good antenna characteristic.

Figure 7:
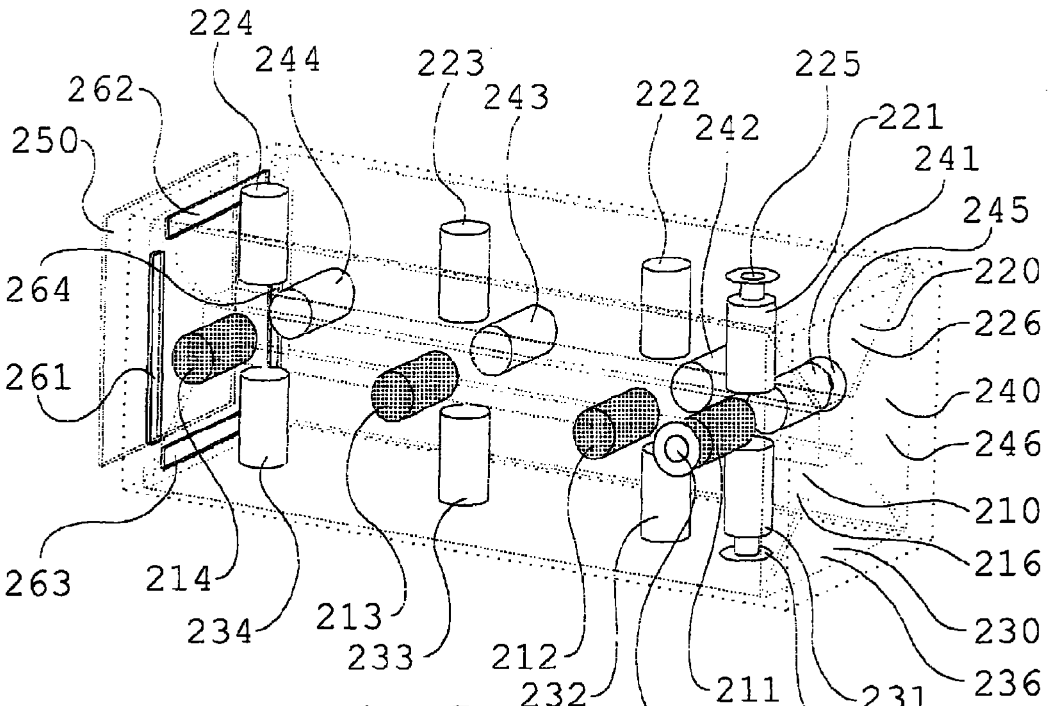
FIG. 7 is a schematic perspective view of an antenna-filter module according to a second embodiment of the invention, also with four parallel filters arranged in parallel to each other in triangular boxes and coupled to a patch antenna element.
Figure 8:
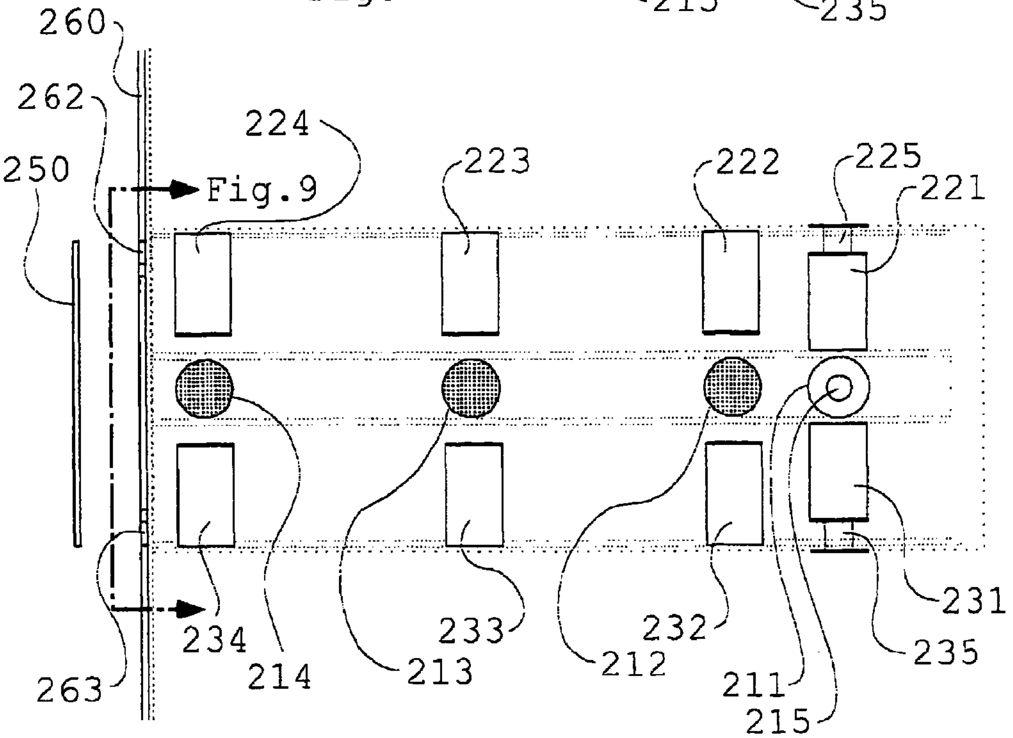
FIG. 8 is a side view of the module shown in FIG. 7.
Figure 9:
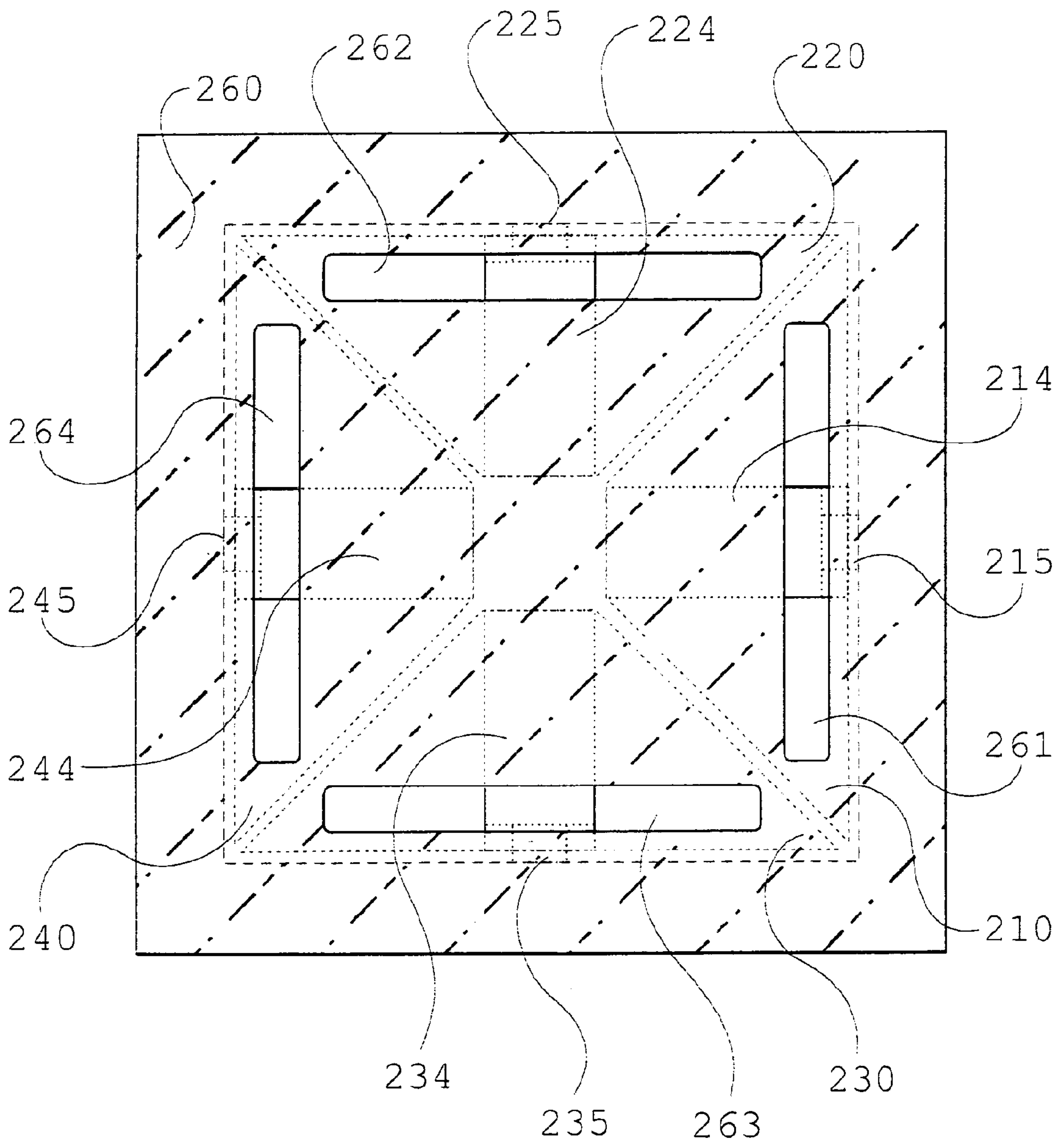
FIG. 9 is an end view from the left of the module shown in FIG. 7, showing the ground plane and the filters.

FIGS. 7-9 show different views of an antenna-filter module according to a-second embodiment of the present invention. In FIGS. 7-9 the same parts of the module have been given the same reference numbers.

The antenna-filter module of the second embodiment of the invention includes four comb-line filters 210, 220, 230, 240 arranged in a star configuration. The comb-line filters are coupled to a patch antenna element 250. Each filter includes four rods 211-214, 221-224, 231-234, 241-244 situated within a triangular box-like casing 216, 226, 236, 246. The three rods in each filter being closest to the patch antenna element, rods 212-214, 222-224, 232-234, 242-244, function as resonator rods and the rod in each filter being farthest away from the patch antenna element, rods 211, 221, 231, 241, are used for coupling.

The four filters 210, 220, 230, 240 are situated in parallel with each other, and with a first of their short side ends in close proximity to the patch antenna. Each of the filters has a triangular cross sectional shape. The short side ends of the four filters together form a substantially square pattern of four triangles each having a corner adjacent the central axis. This can be seen in FIG. 9, which shows an end view of the ground plane and the filters 210, 220, 230, 240 from the left, the way they would look when seen from the antenna patch element 250.

The long sides of the filters extend perpendicularly from the patch antenna element 250, and the rods 211-214, 221-224, 231-234, 241-244 are spaced along the length of the long side of the filters. The rod of each filter being farthest away from the patch antenna, rods 211, 221, 231, 241, all have coaxial cable contacts 215, 225, 235, 245 for connecting each filter to other electrical circuits, such as LNA:s (Low Noise Amplifiers) or PA:s (Power Amplifiers). The resonators being closest to the patch antenna, resonators 214, 224, 234, 244, are coupled to the patch antenna by an electromagnetic coupling through slots 261, 262, 263, 264 in the ground plane of the filters. These slots are, as can be seen in FIG. 9, in the ground plane located in front of the base portions of the short side ends of the four triangle shaped filters, thereby providing coupling of the magnetic field from the resonators to the antenna element.

In the second embodiment of the invention, as well as in the first embodiment of the invention, the bandwidth of the patch antenna 250 is bigger than the bandwidths of each of the filters 210, 220, 230, 240. The total bandwidth for the whole antenna-filter module is also in the second embodiment set by the coupling between the patch antenna 250 and the resonators closest to the patch antenna, resonators 214, 224, 234, 244. The filters of the antenna-filter module are tuned together with the patch antenna element 250, this being the case since the patch antenna element 250 has a similar influence on the characteristics of the filter as an input coupling rod in a comb-line filter. The filter housings do not have a complete filter characteristic without the patch antenna element. The filter and the patch antenna element are therefore tuned together.

The four comb-like filters 210, 220, 230, 240 being arranged in a star configuration according to the second embodiment of the invention are all coupled to the same patch antenna element 250. The patch antenna element 250 is here working as a joint antenna element, being coupled to a number of different filters resulting in a number of different antenna-filter combinations. Two different frequency channels for each of the two polarisations can be achieved in this second embodiment as well. This antenna-filter module will thus also result in a very compact antenna diplexer function.

In this case, a magnetic coupling is provided between the patch antenna element 250 and the closest resonators 214, 224, 234, 244 through the slots 261-264. Thus, the use of slots results in a good magnetic coupling whereas the direct electric coupling is effectively reduced.

Furthermore, the resonator boxes 216, 226, 236, 246 of each of the filters 210, 220, 230, 240 of the second embodiment have a very wide dimension at the side of the resonator box that is in contact with the rods 211-214, 221-224, 231-234, 241-244. More specifically, in the second embodiment of the invention, the rods are in short-circuit contact with the base of the triangle in the triangle-shaped resonator boxes, where the size is bigger. This configuration can give the resonators and therefore also the filters of the second embodiment an advantageous high Q-value under certain conditions, such as certain lengths of the resonators.

Different kinds of antenna elements can be used for the joint antenna element also in the second embodiment of the invention. Amplifiers, such as LNA:s or PA:s can also be integrated in the module of the second embodiment by coupling them to the filter either by the coaxial cable contacts or by electromagnetic coupling.

Figure 10:
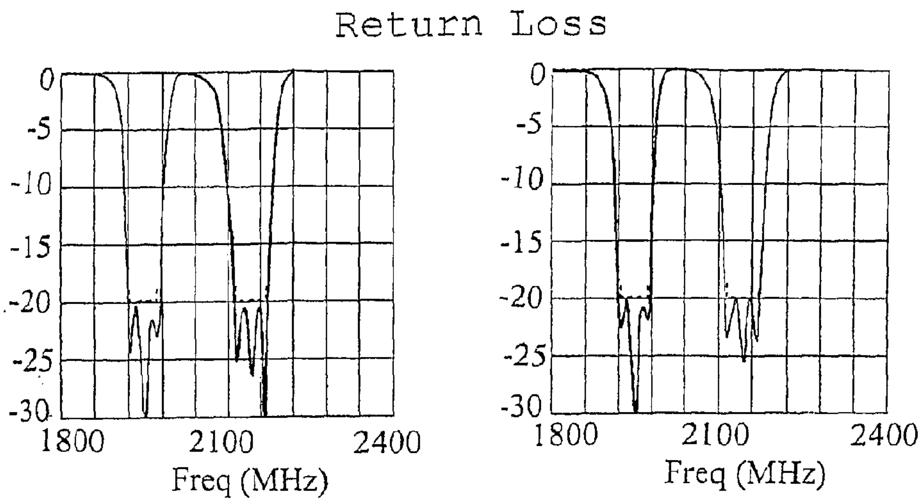
FIGS. 10, 11 and 12 are diagrams showing the return loss, the cross coupling between the various filters and the directivity, respectively, of the module shown in FIGS. 7-9.
Figure 11:
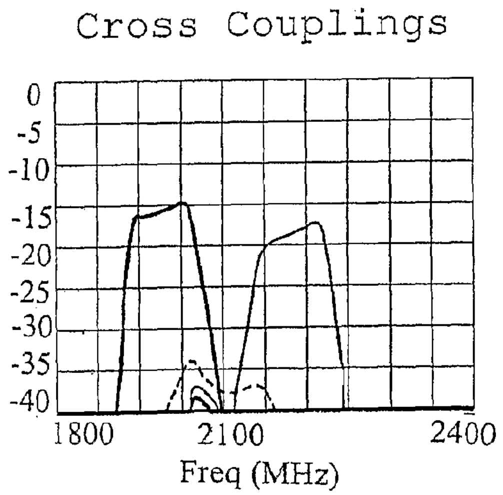
Figure 12:
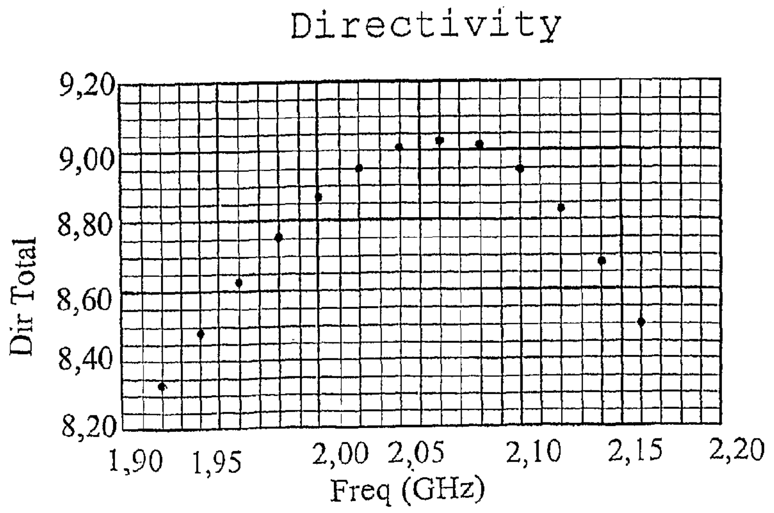

FIGS. 10, 11 and 12 show simulation diagrams of the return loss, the cross coupling between the various filters and the directivity of the antenna-filter module of the second embodiment shown in FIGS. 7-9.

These simulations show, in a similar manner as was described above in connection with FIGS. 4-6, that the antenna-filter module according to the second embodiment of the invention functions very well as an antenna.

Figure 13:
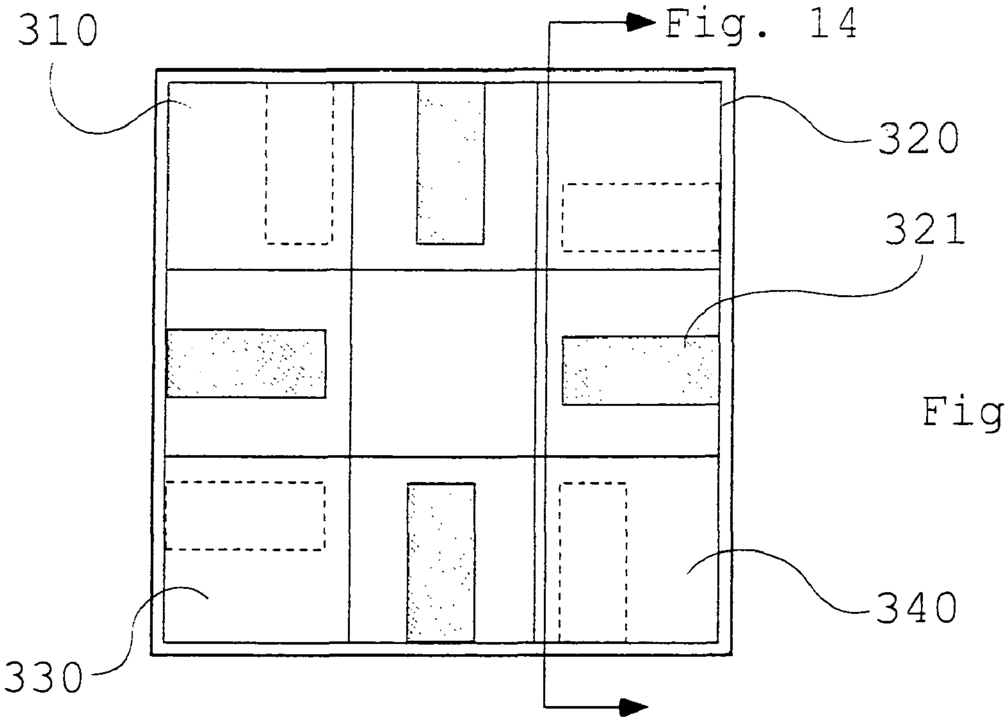
FIG. 13 is a schematic end view of a third embodiment of the module according to the invention.
Figure 14:
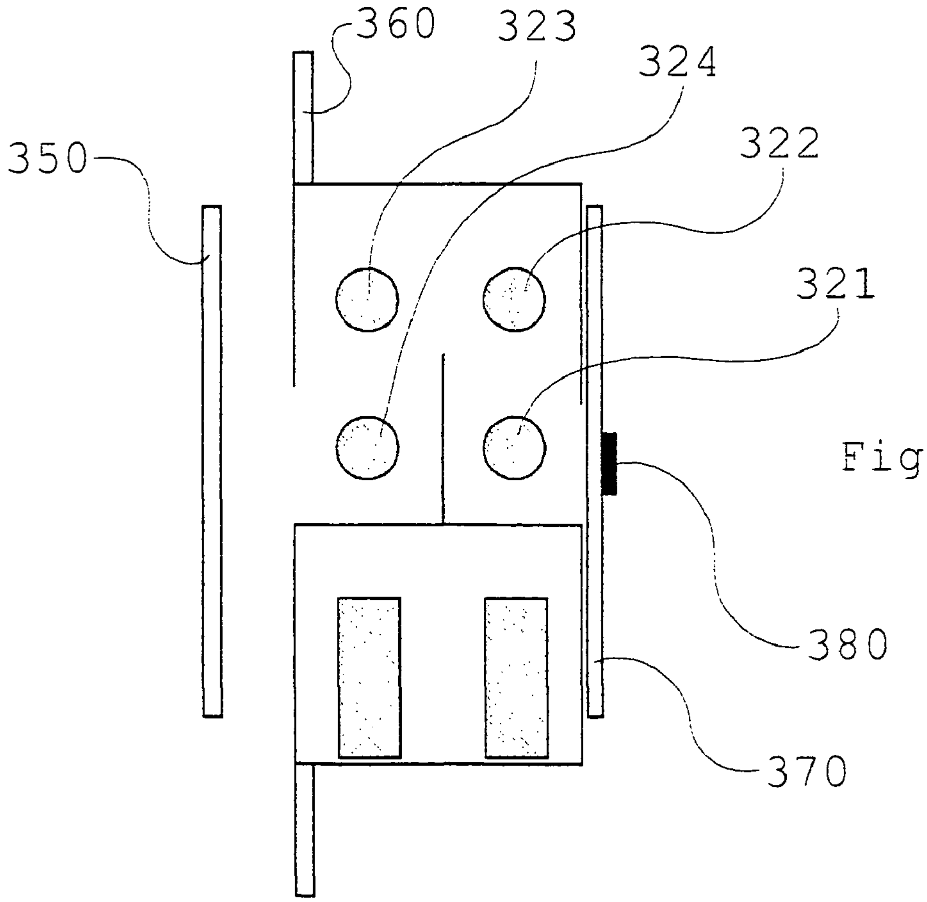
FIG. 14 is a sectional view of the module shown in FIG. 13.

FIGS. 13 and 14 show a schematic end view and a sectional view, respectively, of a third embodiment of the antenna-filter module according to the invention. In this embodiment, the filters 310, 320, 330, 340 are folded into two layer filters making the antenna-filter module very compact. The resonators of the filters are thus not situated in a straight line in this embodiment. As can be seen in FIG. 14 for filter 320, the four resonators 321-324 of filter 320 are folded in an upside-down U-shape. The resonator of filter 320 being closest to the patch antenna element 350, resonator 324, is electromagnetically coupled to the patch antenna element 350 through a slot in a ground plane 360. The resonator of filter 320 being farthest away from the patch antenna element 350, resonator 321, is electromagnetically coupled to an amplifier, such as an LNA or a PA, for instance through a coupling pin 380 on a LNA board 370. All four rods function as resonators in this embodiment, no rods are used for coupling. The filters 310, 320, 330, 340 are thus four pole filters.

According to this embodiment, the whole filter portion of the module is very close to the patch antenna element which minimises losses and gives a very compact module. The folding of the filters makes is possible to make better use of the available space. There is sometimes not enough room for the filters to extend perpendicularly from the patch antenna, but there is often available space for the filters to extend radially, parallel with the patch antenna. This space can be better used by folding of the filters.

An integrated antenna-filter-amplifier module without intermediary transmission lines or contacts is provided by the third embodiment of the invention, resulting in a compact and low loss module.

Figure 15:
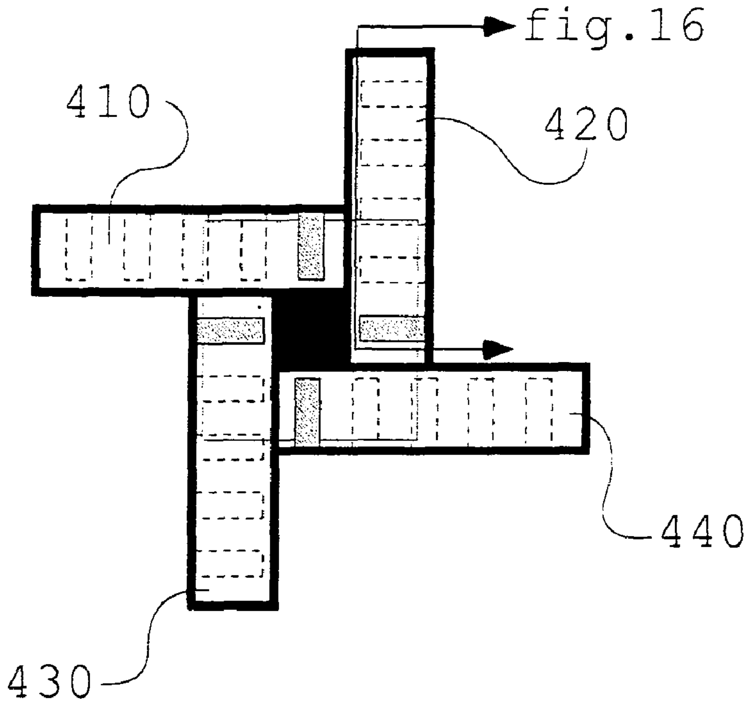
FIG. 15 is a schematic end view of a fourth embodiment of the module according to the invention.
Figure 16:
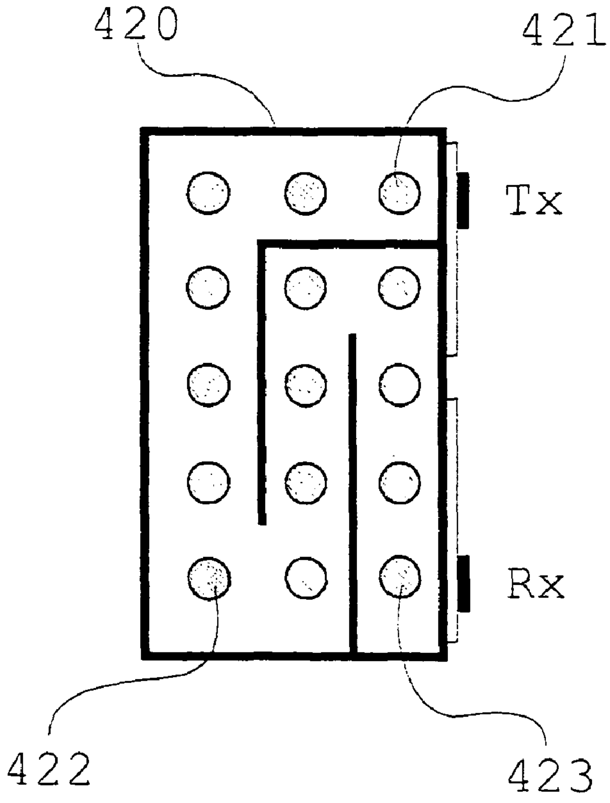
FIG. 16 is a sectional view of the module shown in FIG. 15.

FIGS. 15 and 16 show a schematic end view and a sectional view, respectively, of a fourth embodiment of the antenna-filter module according to the invention. In this fourth embodiment, longer filters 410, 420, 430, 440 are used, which are folded into three layer filters. In FIG. 16, the resonator in the down left corner, resonator 422, is electromagnetically coupled to the patch antenna element. The top right corner resonator, resonator 421, is electromagnetically coupled to a transmission circuitry, such as a PA (Power Amplifier). The down right corner resonator, resonator 423, is electromagnetically coupled to a reception circuitry, such as a LNA (Low noise Amplifier). Different filters, i.e. filters including different resonators, are used for transmission and reception.

This embodiment makes it possible to compactly arrange long filters close to the patch antenna element. Longer filters are sometime used, depending on the specifications in the system standard. A three layer folding according the fourth embodiment of the invention can be advantageous for keeping the filter compact. A three layer folding can further be used for maximising the use of available space for filtering in the antennas. A compact and low loss integrated antenna-filter module or antenna-filter-amplifier module can thus be achieved by the fourth embodiment of the invention.

Figure 17:
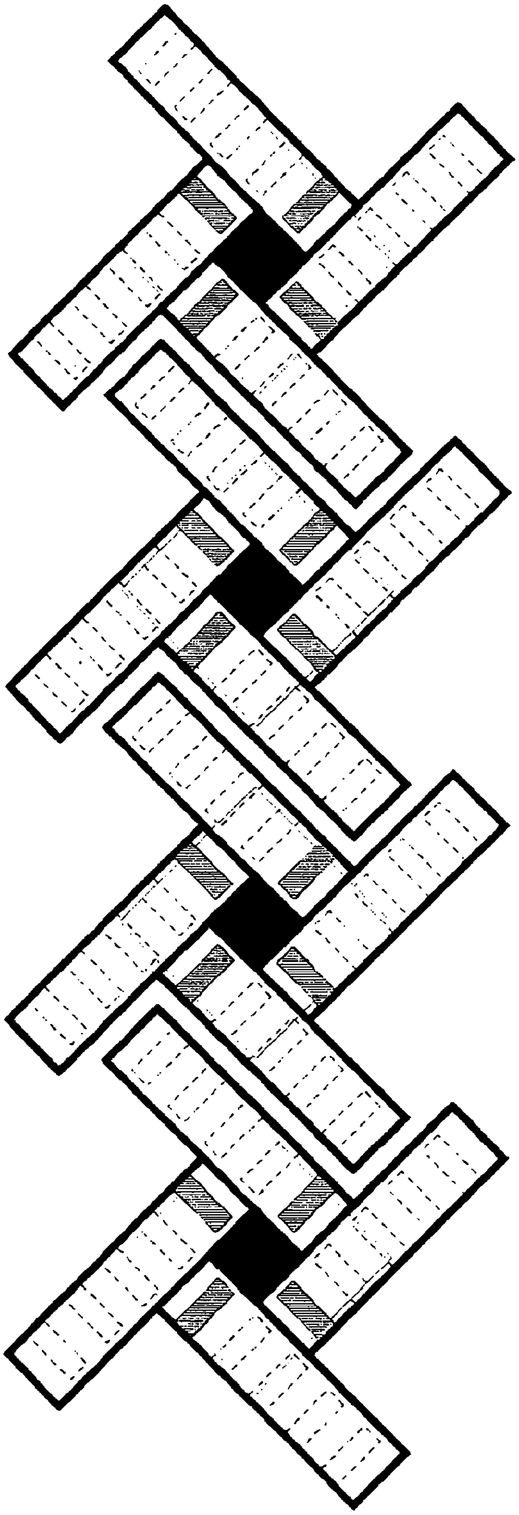
FIG. 17 illustrates how the modules shown in FIGS. 15 and 16 can be arranged in an array so as to form an antenna with several antenna elements disposed along a row.

FIG. 17 shows an example of how an antenna array can be arranged using modules of the present invention. An antenna array using antenna-filter modules of the fourth embodiment of the invention for each element in the array is shown in FIG. 17, but any of the antenna-filter module embodiments of the invention can be used for antenna arrays as the one shown in FIG. 17, as is clear to a skilled person.

Antenna-filter modules according to the different embodiments of the invention all have low losses since the filters are very close to the antenna in the modules. Antenna-filter-amplifier modules according to the invention further have PA:s and a LNA:s very close to the patch antenna element, which also lowers the losses. It is further possible, in antenna-filter-amplifier modules according to the invention, to combine the signals from the PA:s in the air outside the antenna array instead of using an extra combiner that would add losses to the system. No intermediary transmission lines or contacts are used within the modules, which further lowers the losses.

This gives extra margins that can offer a user the choice between having a very low noise figure, implementing the LNA:s in very cheap MMIC (Monolithic Microwave Integrated Circuit) or having smaller and cheaper filters. Different degrees of noise levels and cost levels can thus be achieved by the use of the present invention.

The invention claimed is:

1. An antenna-filter module for transferring radiofrequency (RF) electromagnetic signals in either direction between the ambient air and an electronic circuit, said module including an antenna element and an integrated band pass filter provided with a series of resonators, wherein, the module includes at least two filters disposed adjacent to said antenna element, said antenna element is arranged as a joint antenna element so as to provide a corresponding number of antenna-filter combinations within the module, each filter is provided with a coupling member for coupling to a respective electronic circuit, said joint antenna element has a substantially greater bandwidth than each filter, and said joint antenna element is arranged in close proximity to a first resonator of each filter in the module so as to provide an integrated antenna-filter module without intermediary transmission lines or connectors to provide electromagnetic coupling to the resonators of each filter and a different specific pass band for each of the respective antenna-filter combinations;

wherein each filter in said module is a cavity filter having an electrically conductive casing, and the casing of each filter comprises a first end portion provided with a coupling aperture dimensioned and located so as to secure said electromagnetic coupling between the joint antenna element and said first resonator in the respective filter.

2. The antenna-filter module defined in claim 1, wherein said casing further comprises a second end portion, wherein said series of resonators in said cavity are distributed between said first end portion of said casing, and said second end portion of said casing, and where said second end portion contains said coupling member for coupling to said respective electronic circuit.

3. The antenna-filter module defined in claim 2, wherein the antenna-filter module is configured as a diplex unit for two filters operating in separate frequency bands or in mutually orthogonal polarisations.

4. The antenna-filter module defined in claim 3, wherein the module includes four filters, a first pair of said four filters operating in a first frequency band with mutually orthogonal polarisations, and a second pair of them operating in a second frequency band with mutually orthogonal polarisations, there being four coupling apertures cooperating with said joint antenna element.

5. The antenna-filter module defined in claim 4, wherein each of the four filters is a comb-line filter with resonators in the form of rods.

6. The antenna-filter module defined in claim 5, wherein the four filters have elongated, box-like casings arranged close to each other in a compact arrangement.

7. The antenna-filter module defined in claim 6, wherein the four box-like casings are arranged in parallel and adjacent to each other.

8. The antenna-filter module defined in claim 6, wherein the four box-like casings are arranged in a common plane so as to extend radially outwardly from a common region next to said joint antenna element.

9. The antenna-filter module defined in claim 6, wherein the four box-like casings each have a rectangular cross-sectional configuration.

10. The antenna-filter module defined in claim 6, wherein the four box-like casings each have a square cross-sectional configuration.

11. The antenna-filter module defined in claim 6, wherein the four box-like casings each have a triangular cross-sectional configuration and are arranged in parallel to each other, each with a corner line extending adjacent to a central axis.

12. The antenna-filter module defined in claim 1, wherein said joint antenna element comprises at least one patch radiator.

13. The antenna-filter module defined in claim 1, wherein said antenna element comprises at least one dipole radiator.

14. The antenna-filter module defined in claim 1, wherein the antenna element comprises at least two parts.

15. The antenna-filter module defined in claim 1, wherein said joint antenna element comprises a yagi antenna structure.

16. The antenna-filter module defined in claim 15, wherein said antenna element comprises a number of cooperating patch radiators arranged in a stack, one on top of the other.

17. The antenna-filter module defined in claim 15, wherein said antenna element comprises a number of cooperating patch radiators arranged side by side on a common support structure.

18. The antenna-filter module defined in claim 1, wherein each of said filters is integrated with an amplifier coupled to said coupling member.

19. The antenna-filter module defined in claim 18, wherein said coupling member of the respective filter is coupled to said amplifier via a coupling aperture in a casing accommodating said series of resonators.

* * * * *